UNITED STATES PATENT OFFICE.

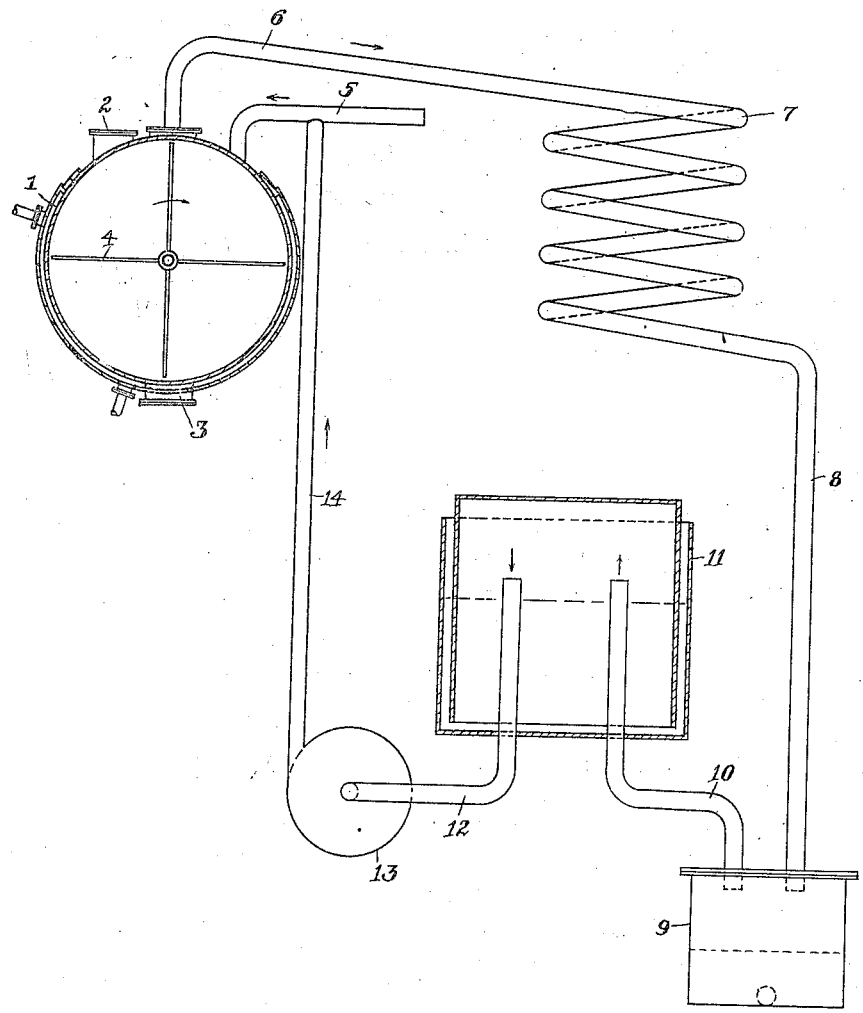

HENRY HOWARD, OF BROOKLINE, MASSACHUSETTS.

PROCESS OF DRYING SODIUM-BISULFITE CRYSTALS.

1,138,658.    Specification of Letters Patent.    Patented May 11, 1915.

Application filed June 24, 1913. Serial No. 775,608.

*To all whom it may concern:*

Be it known that I, HENRY HOWARD, a citizen of the United States, residing at Brookline, in the county of Norfolk and State of Massachusetts, have invented certain new and useful Improvements in Processes of Drying Sodium-Bisulfite Crystals, of which the following is a specification.

When wet crystals of sodium bisulfite, $NaHSO_3$, are dried in an atmosphere of air, they decompose to a considerable extent, with evolution of sulfur dioxid. According to the present invention, such readily-decomposable crystals are dried in an atmosphere of the gas which would be evolved by their decomposition. The process is preferably carried out by stirring the wet bisulfite crystals within a closed steam-jacketed chamber, passing a current of sulfur dioxid through this chamber, and condensing and removing the moisture from the effluent gas and returning it to the drying-chamber.

Suitable apparatus for carrying out the process is shown in the accompanying drawing, in which the figure is a side elevation, the drying-chamber and a gas-holder being shown in transverse section. This drying-chamber 1 is a gas-tight cylindrical steam-jacketed drum, having an inlet 2 for the wet crystals and an outlet 3 for the dry crystals. An agitator 4 having radial stirring-arms is concentrically journaled within this chamber. A pipe 5 for supplying sulfur dioxid leads into the chamber, and a pipe 6 for removing the moisture-laden gas leads from the top of the chamber to a condenser 7. The chamber 1 and condenser 7 are maintained at suitable different temperatures, to occasion the requisite difference of aqueous vapor-pressures therein. From the condenser, a pipe 8 leads downward to a vessel 9 in which the water is collected. The water-free gas thence passes through a pipe 10 into a gas-holder 11, from which it is drawn by a pipe 12 and pump 13 and forced through a pipe 14 back to the drying-chamber. The gas-holder may be omitted.

Instead of, or in addition to heating the crystals by steam, the sulfur dioxid or other gas, after leaving the condenser, may be preheated before it is returned to the drying-chamber, thereby serving as a heating medium. Whatever the heating means employed, the use of an atmosphere of sulfur dioxid, or other gas which would result from the decomposition of the particular compound to be dried, affords proper conditions for the rapid removal of moisture from the heated mass.

The process is especially applicable to the drying of both sodium bisulfite and metabisulfite ($Na_2S_2O_5$) crystals, both of which are included under the term "sulfite crystals," in the claims.

I claim:—

1. The process of drying sulfite crystals, which consists in removing the moisture from said crystals in an atmosphere of sulfur dioxid.

2. The process of drying sulfite crystals, which consists in heating the wet crystals in a closed chamber, and passing a current of sulfur dioxid gas through said chamber.

3. The process of drying sulfite crystals, which consists in heating the wet crystals in a closed chamber, and passing a current of hot sulfur dioxid gas through said chamber.

4. The process of drying sulfite crystals, which consists in heating and agitating the wet crystals in a closed chamber, passing a current of sulfur dioxid gas through said chamber, and removing the moisture from the effluent gas and returning it to said chamber.

5. The process of drying sulfite crystals, which consists in heating and agitating the wet crystals in a closed chamber, passing a current of hot sulfur dioxid gas through said chamber, and removing the moisture from the effluent gas and returning it to said chamber.

In testimony whereof I affix my signature in presence of two witnesses.

HENRY HOWARD.

Witnesses:
I. M. GRAHAM,
M. V. O'BRIEN.